3,113,116
METHOD OF MAKING A FOAMED PLASTISOL CONTAINING A SMALL AMOUNT OF WATER
William J. Smythe, Ridgewood, N.J., and Egon M. Muller, Hastings on Hudson, N.Y., assignors, by mesne assignments, to Union Carbide Corporation, New York, N.Y., a corporation of New York
No Drawing. Filed Mar. 6, 1957, Ser. No. 644,198
10 Claims. (Cl. 260—2.5)

This invention relates to the manufacture of vinyl resin products having a cellular structure, commonly referred to as "foam" or "sponge" products.

A suitable process for the manufacture of such products is disclosed in United States Patent 2,666,036 in which a vinyl resin such as polyvinyl chloride or copolymers thereof, blended with sufficient organic plasticizer to produce a free flowing mass, sometimes referred to as a plastisol, is caused to absorb an inert gas under pressure, and is then discharged in fluid state in the form of a creamy, free-flowing foam which is subsequently cured to produce a finished cellular product.

In the manufacture of such products, it has been found that the results were frequently erratic with respect to the size and uniformity of the cells of the finished, cured product. That is, despite all precautions to insure that all operating conditions of successive runs remained precisely the same, the cellular structure of the finished, cured product sometimes consisted of uniformly small, fine cells, while at other times it consisted of large, coarse cells of irregular size. Since most users of the finished product prefer a uniform, small, fine cell structure, the inability to produce it consistently has been a source of serious difficulty in manufacturing operations.

It is, accordingly, an object of the invention to provide a method of processing polyvinyl ester plastisols which makes possible the consistent production of foam of the desired quality, particularly as to cell structure, size and uniformity.

Other objects and advantages of the invention will appear hereinafter.

We have discovered that a small quantity of water in the polyvinyl plastisol composition has profound effects on the physical structure of the foam produced therefrom, and that by controlling the water content of the plastisol within relatively narrow limits, foam having uniform, small, fine cell structure may be consistently produced. The water content of the plastisol should be within the range from about 0.1 percent by weight to about 0.5 percent by weight.

Within this range, the water content of the plastisol will vary, depending on whether or not a wetting agent is added to the plastisol. In the presence of a wetting agent such as a 50 percent solution of Aerosol OT (sodium dioctyl sulfo succinate) in dioctyl phthalate, for example, the water content should be within the range from about 0.1 percent to 0.25 percent, while if no wetting agent is present, the water content should be within the range from about 0.2 percent to 0.5 percent.

In order to insure control of the water content of the plastisol during the entire manufacturing operation from the mixing of the plastisol to the curing of the foam produced therefrom, we further control the moisture condition of the atmosphere within which the mixing of the plastisol, the processing of the plastisol to generate foam therein, and the depositing of the foamed plastisol in molds or on conveyors, are conducted. Such control of the moisture condition of the atmosphere involves two phases. First, the moisture content of the atmosphere within which said operations are conducted should be less than 50 grains of water per pound of bone dry air, and preferably within the range of 15 grains to 25 grains per pound of bone dry air. Second, in the processing step in which the plastisol is caused to absorb gas, it is frequently desirable to chill the plastisol to facilitate gas absorption as an aid to the production of low density foam. Therefore, within the area wherein the foamed plastisol is discharged and deposited in molds or on conveyors, the dew point of the surrounding atmosphere should be maintained below the temperature of the foamed plastisol at the point of discharge, and preferably within the range from 5° to 15° F. below the temperature of the foamed plastisol.

Since the amount of water necessary to control the cell size is of a very low order of magnitude, it should preferably be added in such a way that good dispersion in the plastisol results. It is usually desirable to first emulsify the water in an emulsifying agent which is compatible with the plastisol. Direct additions of water to the plastisol are not desirable.

A preferred method is to disperse the water in one or more of the stabilizers which are commonly added to the plastisol to prevent degradation of the resin during the curing or fusion step and to prevent degradation of the finished product from the effect of ultra violet light thereon. Such stabilizers are compatible with the plastisol.

Preparation of the plastisol follows conventional technique in that the resin, plasticizer and stabilizer are carefully mixed together to form a smooth thick liquid. Any suitable mixing equipment such as the well known Hobart mixer may be used for this purpose.

In preparation for mixing the plastisol, it is important to determine the water content of the various ingredients with accuracy, in order that the amount of water introduced may be carefully regulated in controlling the total water content of the system to the desired level within the range from about 0.1 to about 0.5 percent by weight. Generally it is safe to assume that the stabilizer and wetting agent are free of water. The resins and plasticizers which are commercially available contain varying quantities of water, however, and the percentage present must be accurately determined. Thus, in plasticizers as commercially obtained the water content may vary from about 0.05 percent up to about 0.1 percent. Similarly, the water content of the resin may vary from as much as about 0.075 to about 0.15 percent by weight.

In the several examples described below, the ingredients used, unless otherwise noted, are free of water and the entire water adjustment was made by the addition of the amount noted. In practice, however, any significant amount of water in the resin, plasticizer, stabilizer, or wetting agent must be taken into account in controlling the final amount in the system.

In the quite unusual case where water present in each of the individual ingredients is sufficient to bring the total in the plastisol beyond about 0.5 percent by weight, care must be taken to use one or more in water-free form. In general, it is preferable in preparing the plastisol to start with ingredients as dry as possible and to add water, as required.

The details of compounding the plastisols are best understood by referring to the following specific examples:

Example I

A plastisol was made using the following ingredients:

| | Parts by weight |
|---|---|
| Geon 121—polyvinyl chloride resin | 100 |
| Plasticizer: | |
|    Octyl diphenyl phosphate | 25 |
|    Dioctyl adipate | 25 |
|    Dioctyl phthalate | 10 |
| Stabilizer: | |
|    Barium-cadmium organic complex (liquid) stabilizer, commercial form, such as—Barca 10-Ferro 1203 Mark M-Ferro 1206 BC105 | 2 |
| Wetting agent: | |
|    50 percent solution of Aerosol OT (sodium dioctyl sulfo succinate) in dioctyl phthalate | 1.5 |
| | 163.5 |
| Water | 0.25 |
| Total | 163.75 |

The plastisol was mixed in the following manner: The resin was placed in an open tank. Meanwhile, having determined, by test, that both resin and plasticizers were substantially free of water, 0.25 part of water was added to the stabilizer, this quantity of water being approximately 0.15 percent of the total. The mixture was then emulsified and added to the resin in the tank. The wetting agent was then added to the plasticizers which were mixed together in another tank. 42.5 parts of this mixture were added to the resin and stirred with a Hobart mixer for 5 minutes. Then the remainder of the plasticizer was added to the batch, and mixed for an additional 10 minutes. At the end of the mixing period, the plastisol was drained into a drum and carried to the processing apparatus in which it was to be subjected to gas pressure as previously referred to. The plastisol was then processed to subject it to carbon dioxide gas under pressure. During the processing treatment, the plastisol was chilled, and it was discharged from the processing apparatus as raw foam at a temperature of 25° F. It was discharged onto a conveyor which carried the raw foam into a field of radio frequency electrical energy at an applied voltage of approximately 14 kv. and held in that field for a period of approximately two minutes. The cured product had a density of approximately 4.0 pounds per cubic foot and a uniform cellular structure consisting of small, fine cells.

The entire processing, including the mixing of the plastisol, the processing of the plastisol and the curing of the foam, was carried out in an air conditioned room in which the moisture content was maintained at less than 50 grains per pound of bone dry air. The discharge end of the processing apparatus and the end of the conveyor on which the raw foam was deposited were enclosed within a hood within which the dew point of the enclosed air was maintained at a temperature below the temperature of the discharged foam.

Example II

A plastisol was made containing the ingredients of Example I, except that the wetting agent was omitted, the total of the remaining parts being 162.0. The procedure was the same as in Example I, except that 0.50 part of water was added to the stabilizer and emulsified therewith, this quantity being approximately 0.31 percent of the total. The quality of the foam following formation as in Example I, was essentially the same as that obtained in Example I.

Example III

Plastisols were made containing the ingredients of Examples I and II except that it was determined, by test, that the water content of the resin was approximately 0.09 percent or 0.09 part, and that the water content of the plasticizers was approximately 0.07 percent or 0.042 part. Accordingly, in the plastisol of Example I, only 0.118 part of water was added to provide a total water content approximately equal to that of Example I. In the plastisol of Example II, only 0.368 part of water was added to provide a total water content approximately equal to that of Example II. The quality of foam following formation as in Example I was essentially the same as in Example I.

Example IV

A plastisol was made using the following ingredients:

| | Parts by weight |
|---|---|
| Geon 121—polyvinyl chloride resin | 100 |
| Plasticizer: | |
|    Octyl Diphenyl phosphate | 38 |
|    Diisooctyl adipate | 25 |
| Stabilizer: Barium-cadmium organic complex (liquid) stabilizer | 2 |
| Wetting agent: | |
|    Sodium dioctyl sulfo succinate | 0.5 |
| | 165.5 |
| Water | .4 |
| | 165.9 |

These ingredients were mixed and processed in the same manner as in Example I, although it will be noted that the quantity of water was somewhat larger than in Example I, being approximately 0.25 percent. Foam produced was essentially of the same fine quality as that in Example I.

Example V

A plastisol was made containing the ingredients of Example IV, except that the wetting agent was omitted, the total of the remaining parts being 165. The procedure was the same as in Example IV, except that 0.80 part of water was added to the stabilizer and emulsified therewith, this quantity being approximately 0.48 percent of the total. Foam produced was of essentially the same quality of that in Example I.

Example VI

Plastisols were made containing the ingredients of Examples IV and V, except that it was determined, by test, that the water content of the resin was approximately 0.10 percent or 0.10 part, and the water content of the plastisol was approximately 0.08 percent or 0.05 part. Accordingly, in the plastisol of Example IV, only 0.25 part of water was added to provide a total water content approximately equal to that of Example IV. In the plastisol of Example V, only 0.65 part of water was added to provide a water content approximately equal to that of Example V.

In the foregoing examples, the same basic resin was used in each in order to permit direct comparison of the effect of water content of the plastisol. Similar results are observed, however, with other vinyl resin formulations. For example, instead of using polyvinyl chloride resin alone, copolymers of vinyl chloride and other vinyl esters, such as vinyl acetate or vinyl maleate, may be used. A wide variety of known plasticizers compatible with the polymers may also be substituted for those above named. Other stabilizers may also be employed. A specific example of a different formulation giving satisfactory results with the procedures of Examples I–VI is as follows.

| | Parts |
|---|---|
| Resin: VYNV-2—a mixture of polyvinyl chloride and a copolymer of vinyl chloride and vinyl acetate, or (vinyl maleate, etc., copolymers in mol ratios useful as resins) | 100 |
| Plasticizers: | |
| Dioctyl adipate | 25 |
| Tricresyl phosphate | 50 |
| Butyl benzyl phthalate | 25 |
| Stabilizer: Dibutyl tin dilaurate | 2 |

It has been found that in general the relationship of cell size to water content is such that too little water, i.e., less than about 0.1 percent, induces a large, coarse cellular structure; too much water, i.e., more than about 0.5 percent, induces non-uniformity with too many large cells. Also, where the water content goes materially beyond the maximum 0.5 percent, it is found that the foam will not flow readily and does not fill molds accurately. It is difficult to level properly on a conveyor with the usual doctor blade. The new foam is also likely to collapse when placed in a radio frequency field for curing.

With too much water, blisters also form on the surface of the foam and these often penetrate deeply into the foam. Then again, too little water induces surface craters on the foam which also penetrate deeply into the foam. When the water content of the plastisol is properly adjusted in accordance with the present invention, the resulting foam is characterized by a cell structure consisting of uniformly small cells averaging in the neighborhood of 1/64 inch in diameter or slightly less.

Though the invention has been described with reference to only a limited number of examples, it is to be understood that variations thereof may be practiced without departing from its spirit or scope.

What is claimed is:

1. The method of forming resilient spongy foams from plastisol compositions in liquid form of polymerized material in particulate form selected from the group consisting of polyvinyl chloride and copolymers of vinyl chloride and vinyl acetate suspended in a plasticizer therefor, which foams are characterized by the uniformity of their cellular structure which comprises, as a first preparatory step, adjusting the plastisol to a water content in the range from about 0.1 percent to about 0.5 percent by weight of the entire composition, said amount of water being insufficient to serve as a blowing agent to form sponge, forming a foam from said plastisol, maintaining the water content of said plastisol in that range during the formation of the wet foam, and maintaining the humidity of the surrounding atmosphere in which the foam is generated below about 50 grains of water per pound of air, discharging the plastisol foam into an atmosphere having a dewpoint below the temperature of the foamed plastisol and curing the foam by heating to give it permanent porous form.

2. The method in accordance with claim 1 in which the plastisol contains a vinyl chloride-vinyl acetate copolymer resin suspending in a plasticizer, and a stabilizer for the said resin.

3. The method in accordance with claim 1 in which the plastisol contains a polyvinyl chloride resin suspended in a plasticizer, and a stabilizer for the said resin.

4. The method in accordance with claim 1 wherein the water content is maintained between 0.1 and 0.25 percent by weight and a wetting agent is employed in the plastisol.

5. In the process of preparing resilient spongy foams from plastisol compositions in liquid form of polymerized material selected from the group consisting of poly-vinyl chloride and vinyl chloride-vinyl acetate copolymers suspended in a plasticizer therefor, wherein the plastisol is subjected to a relatively high gas pressure above atmospheric pressure which is subsequently suddenly released to atmospheric pressure thereby forming a foam, the improvement comprising the steps of uniformly blending into the plastisol composition prior to forming the foam about 0.1 percent to 0.5 percent by weight of water, said amount of water being insufficient to serve as a blowing agent to form sponge, forming a foam from said plastisol, maintaining the water content of the plastisol in that range during the formation of the wet foam and maintaining the moisture content of the surrounding atmosphere in which the foam is generated below about 50 grains of water per pound of air, and thereafter discharging the foamed plastisol into an atmosphere having a dewpoint below the temperature of the foamed plastisol and curing the foam by heating to give it permanent form.

6. The method in accordance with claim 5 in which the dewpoint of the surrounding atmosphere in which the foam is discharged is maintained at a temperature about 5° to 15° F. below the temperature of the foamed plastisol.

7. In the process of preparing polyvinyl chloride resin foam products wherein a plastisol of the resin suspended in a plasticizer therefor is subjected to mechanical beating to generate foam, the improvement comprising the steps of uniformly blending into the plastisol composition prior to forming the foam sufficient water to bring the total water content to about 0.1 percent to about 0.5 percent by weight, said amount of water being insufficient to serve as a blowing agent to form sponge, forming foam from said plastisol, maintaining the water content of the plastisol in that range during the formation of the foam, and maintaining the moisture content of the surrounding atmosphere in which the foam is generated below about 50 grains of water per pound of air and, thereafter, discharging the foamed plastisol into an atmosphere having a dewpoint below the temperature of the foamed plastisol and curing the foam by heating to give it permanent form.

8. The method in accordance with claim 7 in which the dewpoint of the surrounding atmosphere in which the foam is discharged is maintained at a temperature about 5° to 15° F. below the temperature of the foamed plastisol.

9. The method according to claim 7 in which the humidity of the air surrounding the foam as it is formed and discharged is maintained at less than about 25 grains per pound of air and the temperature of the foam is kept above the dewpoint of the said air.

10. In the formation of polyvinyl chloride containing foams, wherein a plastisol containing polyvinyl chloride resin suspended in a plasticizer therefor and containing a stabilizer for the resin is subjected to foam-forming conditions, the improvement which comprises blending with the said plastisol, while it is in liqiud form, a dispersion of water and the stabilizer for the resin in an amount sufficient to adjust the total water content to about 0.1 to 0.5 percent by weight of water based on the entire weight of the composition, said water being insufficient to serve as a blowing agent to form sponge and, thereafter, subjecting the plastisol containing the said water and stabilizer to foam-formation conditions in an atmosphere maintained at below about 50 grains of moisture per pound of air and, thereafter, discharging the foamed plastisol into an atmosphere having a dewpoint below the temperature of the foamed plastisol and curing the foam by heating to give it permanent form, while at all times maintaining the water content of the composition within the above specified range.

References Cited in the file of this patent

UNITED STATES PATENTS

| | | |
|---|---|---|
| 2,386,995 | Wigal | Oct. 16, 1945 |
| 2,624,718 | Bezman et al. | Jan. 6, 1953 |
| 2,666,036 | Schwencke | Jan. 12, 1954 |
| 2,864,777 | Greenhoe | Dec. 16, 1958 |